United States Patent [19]

Paesch et al.

[11] Patent Number: 4,935,697
[45] Date of Patent: Jun. 19, 1990

[54] METHOD AND APPARATUS FOR DETECTING A PROJECTILES FLIGHT PATH BY SENDING A MAGNETIC FIELD PRODUCED BY MOVEMENT OF FRICTIONALLY IMPARTED ELECTRICAL CHANGE ON THE PROJECTILE

[75] Inventors: Alexander Paesch, Celle-Lhs; Klaus H. Nahrwold, Unterluss, both of Fed. Rep. of Germany

[73] Assignee: Rheinmetall GmbH, Düsseldorf, Fed. Rep. of Germany

[21] Appl. No.: 252,368

[22] PCT Filed: Nov. 26, 1987

[86] PCT No.: PCT/EP87/00733
§ 371 Date: Sep. 27, 1988
§ 102(e) Date: Sep. 27, 1988

[87] PCT Pub. No.: WO88/05914
PCT Pub. Date: Aug. 11, 1988

[30] Foreign Application Priority Data

Jan. 28, 1987 [DE] Fed. Rep. of Germany ....... 3702429

[51] Int. Cl.$^5$ .................. G01P 3/66; G01R 33/02
[52] U.S. Cl. ................................ 324/179; 73/167; 324/72; 324/160; 324/207.15; 324/454
[58] Field of Search .......... 324/72, 160, 163, 178, 324/179, 207, 208, 258, 452, 454; 73/167; 89/1.1

[56] References Cited

U.S. PATENT DOCUMENTS

| | | | |
|---|---|---|---|
| 2,146,723 | 2/1939 | Dunham et al. | 324/178 X |
| 2,301,194 | 11/1942 | Bradford | 324/179 |
| 2,369,659 | 2/1945 | Carr | 324/178 |
| 4,372,192 | 2/1983 | Lienau | 324/208 X |

FOREIGN PATENT DOCUMENTS

| | | |
|---|---|---|
| 906060 | 7/1972 | Canada. |
| 1673382 | 1/1972 | Fed. Rep. of Germany. |
| 2648186 | 4/1978 | Fed. Rep. of Germany. |
| 965077 | 7/1964 | United Kingdom. |

OTHER PUBLICATIONS

Lee et al., Determination of Lightning Current Using Frame Aerials IEEE Transactions on Power Apparatus and Systems, vol. PAS-98, No. 5 Sep./Oct. 1979, pp. 1669-1675.

Primary Examiner—Gerard R. Strecker
Attorney, Agent, or Firm—Spencer & Frank

[57] ABSTRACT

A method and an apparatus for measuring a flight path parameter of a projectile (7) or parts thereof during flight possibly into the region of the target, with the electrical charge imparted to the projectile (7) or its part by friction with the air and/or by the gas fumes generated during ignition or detonation being detected by means of at least one inductively operating sensor (1) and the zero passage of the resulting signal is evaluated. The resulting signal can be utilized to measure time of flight, velocity, a time pattern for the distribution of fragments or the like.

12 Claims, 1 Drawing Sheet

4,935,697

METHOD AND APPARATUS FOR DETECTING A PROJECTILES FLIGHT PATH BY SENDING A MAGNETIC FIELD PRODUCED BY MOVEMENT OF FRICTIONALLY IMPARTED ELECTRICAL CHANGE ON THE PROJECTILE

BACKGROUND OF THE INVENTION

The invention relates to a method and an apparatus for measuring a projectile or parts thereof during flight, possibly into the target region.

Various methods are known in the ballistic measuring art to determine different variables of interest with respect to a projectile or parts thereof. Optical measuring methods are dependent on the weather and the time of day and are expensive. For inductive measuring methods, the projectile must be magnetized which, however, is not always possible for the most varied reasons, for example because the material is not magnetizable (hard core projectiles or the like). Particularly in connection with projectiles produced by explosion, no or only very unsatisfactory results are obtained.

SUMMARY OF THE INVENTION

It is an object of the present invention to provide a method and an apparatus for measuring a projectile or parts thereof, with such method and apparatus being easy to operate, usable in many ways and permitting the use of simple and inexpensive sensors.

This is accomplished by a method in which the electrical charge imparted to the projectile or its parts by friction with the air and/or by the gas fumes generated upon ignition or detonation is detected by means of at least one inductively operating sensor, and the zero passage of the resulting signal is evaluated.

In this connection the fact is utilized that a projectile on its way to the target receives an electrical charge from friction with the air. When passing the sensor or flying through the sensor, this charge, as a result of the magnetic field generated by a moving charge, produces a voltage in the induction coil of the sensor in the form of a signal which passes through zero. This signal can be utilized to measure the flight time of the projectile in that the time between firing and the occurrence of the zero passage is measured from which the velocity of the projectile can be determined. Moreover, the signal may actuate other measuring devices, e.g. target X-ray devices.

Additionally, the velocity of the projectile or its parts can be determined by the use of two or more sensors spaced one after the other at predetermined intervals along the trajectory, with the time difference between the zero passages of the signals of two sensors arranged behind one another being measured.

The fragments of high-explosive projectiles or the like are also electrically charged by the gas fumes of the detonator material and can be measured accordingly, thus permitting the determination of a time resolution of the cloud of fragments.

The method may be implemented by means of an apparatus which includes at least one sensor equipped with an induction coil and disposed in the region of the trajectory. This sensor is coupled with an evaluation device which retains at least the time of the zero passage of the signal generated by the sensor.

Further features of the invention will be found in the description below and in the dependent claims.

The invention will now be described in greater detail with reference to embodiments that are illustrated in the attached drawing figures.

DETAILED DESCRIPTION OF THE PREFERRED EMBODIMENTS

Figure 1:
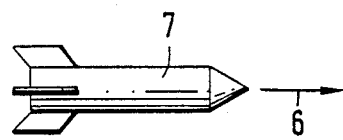
FIG. 1 is a schematic representation of an apparatus for measuring a projectile.
Figure 1:
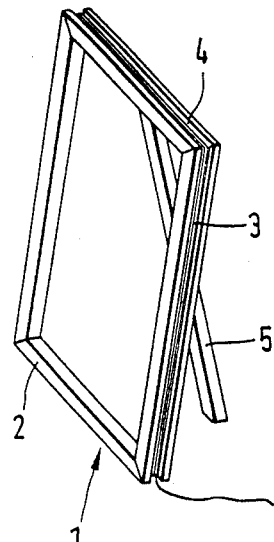
Figure 1:
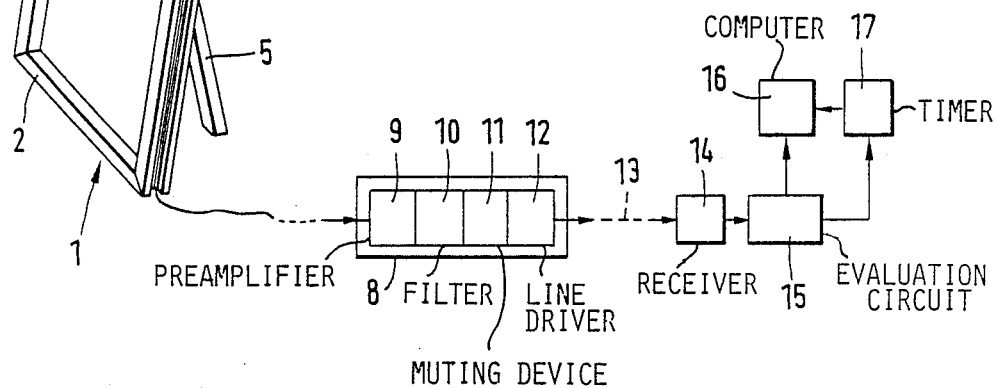

The apparatus shown in FIG. 1 includes a sensor 1 in the form of an induction coil 3 wound onto a frame 2, for example a simple wooden frame. Frame 2 may be provided with a circumferential groove 4 to accommodate a few windings of the insulated wire forming induction coil 3. Moreover, frame 2 may be provided with a stand 5 which facilitates its placement. The area enclosed by induction coil 3 advisably lies in a range of about 1 to 6 $m^2$. Additionally, it is advisable to place frame 2 as perpendicularly as possible to the direction of flight 6 of a projectile 7 to be covered.

Induction coil 3 is connected to an adapter circuit 8 which may include a preamplifier 9, a filter 10, a muting device 11 and a line driver 12. By way of a line 13 and a line receiver 14, the signal generated by the induction coil may be fed to an evaluation device 15, preferably a Transiscope, i.e. digital signal memory and screen display so that a visual evaluation can be made. Additionally, a computer 16 and/or a timer 17 may be connected to make an automatic evaluation.

Figure 2:
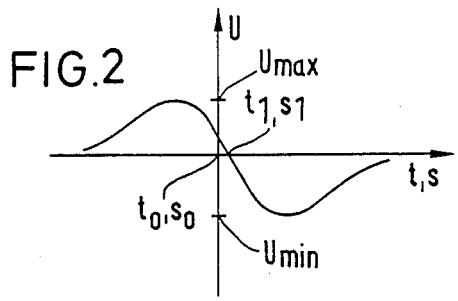
FIG. 2 is a schematic representation of the curve of a signal generated by the sensor of the apparatus of FIG. 1.

If a projectile 7 flies closely past induction coil 3 or through it, a pulse measurable at induction coil 3 has a maximum voltage in an order of magnitude of a few 100 $\mu V$. FIG. 2 shows a voltage pulse as it is generated by induction coil 3 as a function of the time t and the trajectory s, respectively. The time $t_0$ and the path $s_0$ on the abscissa represent the point at which projectile 7 passes induction coil 3. At this point the signal would pass through zero if projectile 7 had a constant electrical charge. Since, however, the electrical charge increases continuously due to the friction of the air, the zero passage of the signal is shifted somewhat to the right—with reference to the path traversed in the direction of flight—toward $t_1$ and $s_1$, respectively. If this shift is lost in the measuring inaccuracy, it need not be considered. However, if necessary, a respective correction can be made since, for the same reason, the amplitudes of the positive and negative branches of the signal do not have the same absolute maximum values $U_{max}$, $U_{min}$, so that a correction value for a determination of the point in time $t_0$ of the passage of projectile 7 can be calculated, for example, by computer 16 from the differences between the two values.

Figure 3:
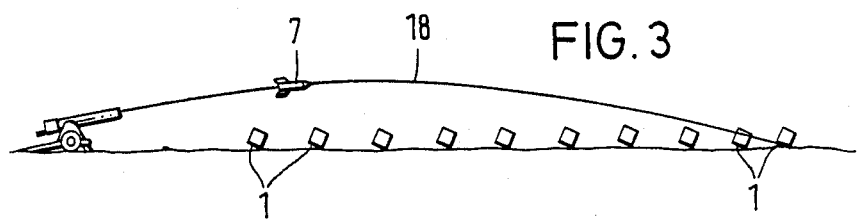
FIG. 3 is a schematic representation of the use of a plurality of sensors along the trajectory of a projectile.

If two or more sensors 1 are arranged at predetermined distances from one another along the trajectory of projectile 7, see FIG. 3, the difference in amplitudes can also be utilized for a determination of the change in charge during flight of projectile 7 and thus for a correction of the time difference between two zero passages of the signals from two sensors 1. If the trajectory of projectile 7 is long, the electrical charge of the projectile approaches a maximum value so that a correction of the zero passage is appropriate only at short distances of about 60 to 80 m from the point of firing or detonation.

With an arrangement according to FIG. 3, the velocity of a projectile 7 can be determined in various sections of its trajectory 18.

The measurement is independent of weather and time of day and does not require magnetization of projectile 7. Even if projectile 7 hits induction coil 3, an evaluatable signal is available since the zero point of the signal was reached. The measurements can also be made at a distance of a few meters from the point of detonation or the location of firing. The costs for induction coil 3 are very low so that it need not be protected against damage. Tumbling projectiles and those turning end over end always produce pulses of the same polarity in contrast to magnetized projectiles which have two magnetic poles. Projectiles having electronic fuses or internal electronic systems and in which magnetization would produce the danger of damage to the electronic system or actuate the fuse can be measured by way of their electrical charges.

We claim:

1. Apparatus for detecting a nonmagnetized projectile or parts thereof along its flight path, comprising: at least one sensor means, including an induction coil having a few windings arranged in a frame which encloses an area in the range of substantially 1 to 6 m² and disposed along the flight path of the projectile or parts thereof, for sensing the magnetic field produced by movement of the electric charge of the projectile caused by air friction; and evaluation means, coupled to said coil, for detecting the zero passage of the signal generated in said coil by said magnetic field.

2. Apparatus according to claim 1, wherein said evaluation means retains at least the time of zero passage of the signal generated by said sensor means.

3. Apparatus according to claim 2, further comprising at least one additional said sensor means, with the two sensor means being arranged at a predetermined distance one behind the other along the flight path of the projectile; and wheren said evaluation means has a circuit for determining the length of the time interval between the zero passages of the respective signals of said two sensor means.

4. Apparatus according to claim 2, wherein said evaluation means further includes means for determining the extreme amplitude values of the signals from said sensor means.

5. Apparatus according to claim 3, wherein said evaluation means further includes means for determining the extreme amplitude values of the signals from said two sensor means.

6. Apparatus according to claim 2, wherein said frame includes support means for positioning said frame so that it is substantially perpendicular to the direction of the flight path of the projectile.

7. Method for detecting a flight path characteristic of a nonmagnetized projectile or parts thereof during flight comprising the steps of: placing a coil, which has a few windings mounted on a frame enclosing an area in the range of substantially one to six square meters, in the region of the flight path of the projectile or parts thereof; sensing, by means of said coil, the magnetic field produced by movement of the electrical charge imparted to the projectile or its parts by friction with the air and/or the gas fumes produced during ignition or detonation; and evaluating the signal produced in the coil by said magnetic field by detecting at least the zero passage of said signal.

8. A method as defined in claim 7 wherein said step of evaluating includes determining and retaining the time of said zero crossing.

9. A method as defined in claim 8 wherein said step of evaluating further includes determining the maximum amplitude values of said signal on either side of the detected zero crossing, and utilizing said maximum amplitude values to provide a correction value for the time of said zero crossing.

10. A method according to claim 7 wherein said step of placing includes orienting the frame so that the windings extend substantially perpendicular to the direction of the flight path of the projectile.

11. A method as defined in claim 7, wherein said step of evaluating includes utilizing the zero passage of the generated signal to measure the time of flight.

12. A method as defined in claim 8, further comprising: arranging at least two of the frame mounted coils one behind the other at a predetermined distance along the flight path of the projectile; and utilizing the time difference between the zero passages of the signals from the two coils disposed one behind the other to determine the velocity of the projectile or its parts.

* * * * *